US005541967A

United States Patent [19]
Gluska et al.

[11] Patent Number: 5,541,967
[45] Date of Patent: Jul. 30, 1996

[54] FAST SYMBOL SYNCHRONIZATION FOR USE IN CONDITIONING A RECEIVING MODEM

[75] Inventors: Eran Gluska, Tel-Aviv; David Almagor, Herzliya, both of Israel

[73] Assignee: National Semiconductor Corporation, Santa Clara, Calif.

[21] Appl. No.: 208,967

[22] Filed: Mar. 9, 1994

[51] Int. Cl.$^6$ ................................ H04L 7/06; H04L 5/16
[52] U.S. Cl. ............................. 375/364; 375/222; 370/32
[58] Field of Search ........................... 375/342, 293, 375/355, 360, 361, 222, 371, 364, 362, 354; 370/100.1, 103, 105.5, 32

[56] References Cited

U.S. PATENT DOCUMENTS 4,852,124  7/1989  Raucci ..................................... 375/360

OTHER PUBLICATIONS

V. 29 FAX modem on the NS32FX16 (Almagor et al), International Conference on DSP Applications and Technology (Oct. 28–31, 1991).
Meeting of Working Parties of Study Group XVII (Geneva, Oct. 16–25, 1991).
National Semiconductor Corporation Manual on System Controller (Jun. 1992).

9600 Bits Per Second Modem Standardized for Use on Point-To-Point 4-Wire Leased Telephone-Type Circuits (Geneva 1976; amended at Geneva 1980, Malaga-Torremolinos, 1984).

*Primary Examiner*—Stephen Chin
*Assistant Examiner*—Kevin Kim

[57] ABSTRACT

Modems at ends of a transmission line are synchronized with each other by a training procedure which initiates each of a plurality of communication sessions occurring while a connection between the modems is established. The initial communication session begins with a long training sequence. Ensuing communication sessions utilize a time-saving short training sequence which includes the following. A coarse timing algorithm establishes synchronization on a symbol boundary from two alternating elements transmitted in accordance with a standard and of which a plurality of amplitude samples are taken. A fine timing algorithm then quickly finds the peak point of the symbol so that the sampling instance can be adjusted accordingly. This is accomplished by identifying, which sample of an element represents the maximum amplitude between the elements. A comparison is made between the identified sample and its preceding one for that element, and the identified sample and its succeeding one for that element. The sampling instance is shifted based on such comparison to thereby adjust the synchronization.

66 Claims, 4 Drawing Sheets

FAST SYMBOL SYNCHRONIZATION FOR USE IN CONDITIONING A RECEIVING MODEM

BACKGROUND OF THE INVENTION

The present invention is directed to a timing acquisition technique for synchronizing a receiving modem with a transmitting modem and, in particular, to speed up the timing acquisition so that it can be completed during a short sequence of a training procedure.

A modem, i.e. a modulator and demodulator, is designed to both transmit and receive data over a transmission line, such as a telephone line, during a period of time called a "connection" which begins when an answering modem goes off-hook in response to a call from a calling modem, and which ends when an on-hook condition is restored. A connection typically includes one or several communication sessions, depending on whether the modem is full-duplex, half-duplex, or a half-duplex emulating a full duplex. Each communication session is a single transmission of a training sequence followed by information data (as explained below) between the transmitter and the receiver modems.

In a full-duplex modem, the modems at both ends of the line transmit and receive simultaneously. A communication session starts with both modems training each other, followed by information data (as explained below). A true half-duplex modem, such as is used for fax transmissions, is either a transmitter or a receiver throughout the connection period. A special application of a half-duplex modem is to emulate a full-duplex modem. This is done by efficient (fast) switching of roles of transmitter and receiver between the two sides, and it allows a system having a half-duplex modem to behave as though it has a full-duplex modem at its disposal. Both modems can swap roles of transmitter and receiver as many times as needed during a connection, with the respective roles being fixed during a communication session.

The present invention applies in particular to a half-duplex modem which emulates full-duplex operation. Data which is transferred, or communicated, from one modem to another during a session is referred to herein as "information data". However, signals other than the information data must also be transferred in order for the modems at the transmitting and receiver ends to cooperate properly. In particular, various parameters of the receiver modem must be set at the initiation of a communication session so that the data is transferred accurately. A training procedure is used for conditioning a receiver modem, and the sequence of bits associated therewith is referred to herein as a "training sequence".

Standards have been established by a number of organizations which define various forms of communication via modem so that dissimilar equipment made by different manufacturers will interact to provide the required result of transferring information data accurately and reliably.. One such organization is the International Telecommunication Union (ITU). Its V.27ter and V.29 standards apply to 4800/2400 bps (bit per second) and 9600/7200 bps modems, respectively. These standards define QAM (quadrature amplitude modulation) modems which are applicable to half-duplex operation, for example. According to these standards, a training procedure which involves two different types of training sequences is used to properly condition the receiver modem. Of the two sequences, the first type is a longer one which is used only for the first session when a receiver modem receives a transmission during the connection. The second type of sequence is shorter, and it is used for the subsequent and all ensuing sessions of that same connection to make the turn-around (i.e. as the transmitter and receiver modems swap roles, and data starts flowing in the opposite direction) time shorter.

FIG. 1 is a block diagram of known steps performed to initiate a connection by a prior art receiver modem which is of the half-duplex type that emulates full duplex operation. The modem goes off-hook in step 1 in answering a ring signal. The training procedure begins with step 3 which receives and processes the above-mentioned long training sequence to make, inter alia, a timing determination, and step 5 follows to suitably adjust the timing in accordance with the results obtained by step 3. Step 6 then receives the transferred information data in a conventional manner. In fact, however, steps 5 and 6 may be combined because the long training sequence and the information data can both be received as part of the same data block which includes the following:

| Training Sequence | Information Data |
|---|---|

The actual digital data block arrangement used depends on which one of many different protocols (eg. BISYNC, SDLC, HDLC) is adopted.

When the communication session ends, step 7 switches the role of the receiver modem to a transmitter, as needed, and then transmits per step 8. The newly designated receiver will then undergo steps 3, 5, 6 and 7, although these steps are not shown because FIG. 1 applies only to control of one modem. When that session ends, step 9 returns the modem to its receiving role (i.e. modem turn-around).

If it is determined by step 10 that more information data remains to be transferred from one side of the transmission line to the other during the current communication session, then step 11 receives and processes the short training sequence, and step 13 adjusts the receiver modem parameters accordingly. The flow returns to step 6 for receiving the additional information data. Steps 6 and 11 can also be combined for the same reason given above regarding the combination of steps 5 and 6. If, however, step 10 determines that all the information data has been transferred, then the connection is terminated as the modem hangs up per step 14.

The two types of training sequences each consist of the following five segments.

TABLE 1

|  | 1 | 2 | 3 | 4 | 5 |
|---|---|---|---|---|---|
|  | | V.27ter: | | | |
| Short | 85–200 ms | 20–25 ms | 14 SI | 58 SI | 8 SI |
| Long | 85–200 ms | 20–25 ms | 50 SI | 1074 SI | 8 SI |
|  | | V.29: | | | |
| Short | 185–200 ms | 20 ms | 100 SI | 62 SI | 18 SI |
| Long | 185–200 ms | 20 ms | 128 SI | 384 SI | 48 SI | where SI is a symbol interval. A "symbol" is the basic unit of information transmitted by the modem (sometimes also referred to by the term "baud"). V.29 modems send 2400 symbols/second with each symbol having 4 bits or 3 bits, thus yielding 9600 or 7200 bps, respectively. V.27ter modems send either 1600 symbols/second with each symbol having 3 bits, thus yielding 4800 bps, or 1200 symbols/ second with each symbol having 2 bits, thus yielding 2400 bps. The training sequence is also defined in terms of symbols.

The task of each segment of the training sequences is well defined in the ITU standards and, therefore, need not be described here in detail. Suffice it to say for the purpose of describing the present invention that segment 3 (as defined in Temporary Document 23-E of the ITU, or the CCITT as it was then known, titled "Liaison Statement to Study Group XVII on Short Train Facility Within V.29") performs, inter alia, timing acquisition in order to synchronize the two modems.

The analog signal received over the transmission line is typically demodulated and detected by digital techniques which involve analog to digital (A/D) conversion as a first step. The sampling method of the A/D conversion can be used to assist the receiver modem to correctly detect the received symbol. In particular, the symbol boundaries are determined accurately by the receiver modem, and then the decision as to which symbol has been received is made at the peak of the symbol power where the accuracy of the decision is maximal and best modem performance can be achieved. The receiver modem uses the feature that the sampling time, or instance, can be set in the A/D converter in order to move the samples, as needed, such that the modem can perform detection at the peak of symbol power.

In the long training sequence, a coarse timing algorithm is performed to determine the deviation from the ideal point at which the received signal should be sampled. The short training sequence also applies a coarse timing algorithm and, in addition, a fine timing algorithm is used to make a timing adjustment. It is feasible to make its segment 3 shorter because the short training sequence benefits from reliance on information gathered in previous sessions, such as the typical gain to use, equalizer coefficients, etc. A considerable time saving can thus be achieved when timing adjustments for a given communication session are made by using only the short training sequence, as is readily apparent from Table 1. Additional timing acquisition steps to achieve synchronization may be performed during transfer of the information data, but this is not a part of the present invention.

During segment 3 of the long training sequence there is sufficient time to make an initial coarse estimate of the correct symbol timing, and then to converge the modem toward perfect synchronization. However, time is scarce during the corresponding segment 3 of a short training sequence. If the modem fails to converge within the time available in a short training sequence, it will consequently make errors during the ensuing reception of information data. The higher the modem speed, the shorter the symbol is and, thus, the receiver modem becomes more vulnerable to synchronization errors. Therefore, fast synchronization is especially important for the higher speeds (e.g. 9600 bps).

SUMMARY OF THE INVENTION

An object of the present invention is to improve the accuracy of acquiring timing by a receiver modem with its training procedure.

Another object of the present invention is to improve the error rate performance of the modem after completion of the short training sequence.

Still another object of the present invention is to provide a faster fine timing algorithm to improve upon the accuracy of the coarse timing determination made during the short training sequence of the modem training operation.

A further object of the present invention is to make the timing acquisition immune to the various line impairments that exist on the public switched telephone network.

These and other objects of the present invention are attained by one aspect of the present invention which is directed to an apparatus for synchronizing modems located at opposite ends of a transmission line with each other as one modem receives an analog signal while a connection is established with another modem over the transmission line. The apparatus includes an analog to digital (A/D) converter coupled to the transmission line for receiving at its input the analog signal to provide a digitized output signal by sampling the analog signal at a sampling instance. A plurality of samples is derived for each of two alternating elements received by the A/D converter. Means is provided for identifying at which of the plurality of samples a designated amplitude difference exists between the two alternating elements. A comparison is made of a relationship of the identified sample to its preceding one and to its succeeding one to provide a timing control signal. The A/D converter includes means for shifting the sampling instance in response to the timing control signal.

Another aspect of the present invention is directed to a modem for receiving information data as symbols in the form of an analog signal from another modem over a transmission line during each of a plurality of communication sessions ocurring while a connection is established therebetween. The analog signal includes a training sequence to synchronize the modems with each other during a training procedure performed at the initiation of a communication session so that the information data is received accurately. An analog to digital (A/D) converter is coupled to the transmission line for receiving at its input the analog signal to provide a digitized output signal by sampling the analog signal at a sampling instance. A means is provided for deriving a plurality of samples for each of two alternating elements received by the A/D converter. A coarse timing circuitry is coupled to the deriving means to locate the symbol boundary. A fine timing circuitry is coupled to the coarse timing circuitry for synchronizing the modem with the other modem, including: (a) means for identifying at which of the plurality of samples a designated amplitude difference exists between the two alternating elements, and (b) means for comparing a relationship of the identified sample to its preceding one and to its succeeding one to provide a timing control signal. The A/D converter includes means for shifting the sampling instance in response to the timing control signal. The symbols are reconstituted in accordance with the timing control signal.

A further aspect of the invention is directed to a method for synchronizing modems at ends of a transmission line with each other as one modem receives an analog signal while a connection is established with another modem over the transmission line. An analog to digital (A/D) conversion receives the analog signal and provides a digitized signal by sampling the analog signal at a sampling instance. A plurality of samples is derived for each of two alternating elements. An identifying step identifies at which of the plurality of samples a designated amplitude difference exists between the two alternating elements. A comparison is made of a relationship of the identified sample to its preceding one and to its succeeding one to provide a timing control signal. The sampling instance is shifted in response to the timing control signal.

One other aspect of the present invention is directed to a method for receiving with a modem information data as symbols in the form of an analog signal from another modem over a transmission line during each of a plurality of communication sessions ocurring while a connection is established therebetween, such analog signal including a training sequence to synchronize the modems with each other during a training procedure performed at the initiation of a communication session so that the information data is received accurately. An analog to digital (A/D) conversion receives the analog signal and provides a digitized output signal by sampling the analog signal at a sampling instance. A plurality of samples is derived for each of two alternating elements. The symbol boundary is located from the plurality of samples with a coarse timing algorithm. The modem is synchronized to the other modem with a fine timing algorithm based on the result of the coarse timing algorithm, including: (a) identifying at which of the plurality of samples a designated amplitude difference exists between the two alternating elements, and (b) comparing a relationship of the identified sample to its preceding one and to its succeeding one to provide a timing control signal. The sampling instance is shifted in response to the timing control signal. The symbols are reconstituted in accordance with the timing control signal.

Still another aspect of the present invention is directed to an apparatus for synchronizing modems located at opposite ends of a transmission line with each other as one modem receives an analog signal while a connection is established with another modem over the transmission line. An oversampling analog to digital (A/D) converter is coupled to the transmission line. A means is coupled to an output of the A/D converter for deriving data points from samples taken from two elements transmitted by the other modem in accordance with a training procedure set by a modem transmission standard, such data points defining an ellipse when plotted on a graph. A means is provided for identifying which of the data points for a given one of the two elements is closest to a vertex of said ellipse. Displacement of the identified data point from the vertex is determined to produce a timing control signal related thereto. Sampling by the A/D converter is controlled in accordance with the timing control signal.

A further aspect of the present invention is directed to a modem for receiving information data as symbols in the form of an analog signal from another modem over a transmission line during each of a plurality of communication sessions ocurring while a connection is established therebetween. The analog signal includes a training sequence to synchronize the modems with each other during a training procedure performed at the initiation of a communication session so that the information data is received accurately. An oversampling analog to digital (A/D) converter is coupled to the transmission line. A means is coupled to an output of the A/D converter for deriving data points from samples taken from two elements transmitted by the other modem in accordance with a training procedure set by a modem transmission standard, such data points defining an ellipse when plotted on a graph. A coarse timing circuitry is coupled to the deriving means to locate the symbol boundary. A fine timing circuitry is coupled to a coarse timing circuitry for synchronizing the modem with the other modem, including: a means for identifying which of the data points for a given one of the two elements is closest to a vertex of the ellipse, and means for determining displacement of the identified data point from the vertex to produce a timing control signal related thereto. Sampling by the A/D converter is controlled in accordance with the timing control signal. The symbols are reconstituted in accordance with the timing control signal.

Still another aspect of the present invention is directed to a method for synchronizing modems located at opposite ends of a transmission line with each other as one modem receives an analog signal while a connection is established with another modem over the transmission line by oversampling an analog to digital (A/D) conversion to digitize signals received from the transmission line, and deriving from the digitized signals data points obtained with samples taken from two elements transmitted by the other modem in accordance with a training procedure set by a modem transmission standard, such data points defining an ellipse when plotted on a graph. The data point for a given one of the two elements which is closest to a vertex of the ellipse is identified, and displacement of the identified data point from the vertex is determined to produce a timing control signal related thereto. Sampling by the A/D converter is controlled in accordance with the timing control signal.

A still further aspect of the present invention is directed to a method for receiving with a modem information data as symbols in the form of an analog signal from another modem over a transmission line during each of a plurality of communication sessions ocurring while a connection is established therebetween, such analog signal including a training sequence to synchronize the modems with each other during a training procedure performed at the initiation of a communication session so that the information data is received accurately. An oversampled analog to digital (A/D) conversion digitizes signals received from the transmission line. The method derives from the digitized signals data points obtained with samples taken from two elements transmitted by the other modem in accordance with a training procedure set by a modem transmission standard, such data points defining an ellipse when plotted on a graph. The symbol boundary is located from the data points with a coarse timing algorithm. The method synchronizes the modem to the other modem with a fine timing algorithm based on the result of the coarse timing algorithm, including: identifying which of the data points for a given one of the two elements is closest to a vertex of the ellipse, and determining displacement of the identified data point from the vertex to produce a timing control signal related thereto. Sampling by the A/D conversion is controlled in accordance with the timing control signal, and the symbols are reconstituted in accordance with the timing control signal.

DETAILED DESCRIPTION OF THE INVENTION

Figure 1:
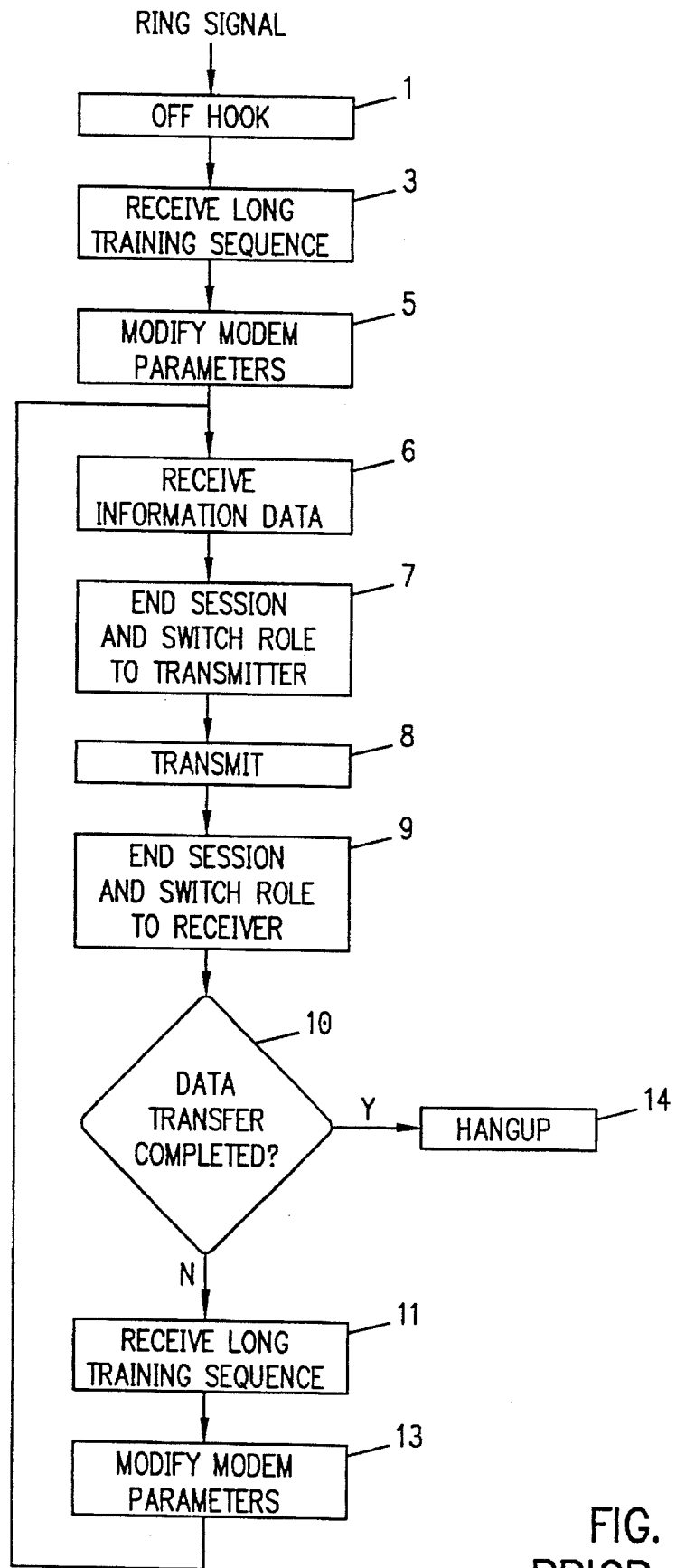
FIG. 1 is a flowchart of a prior art approach to train the receiver modem for transfer of data.
Figure 2:
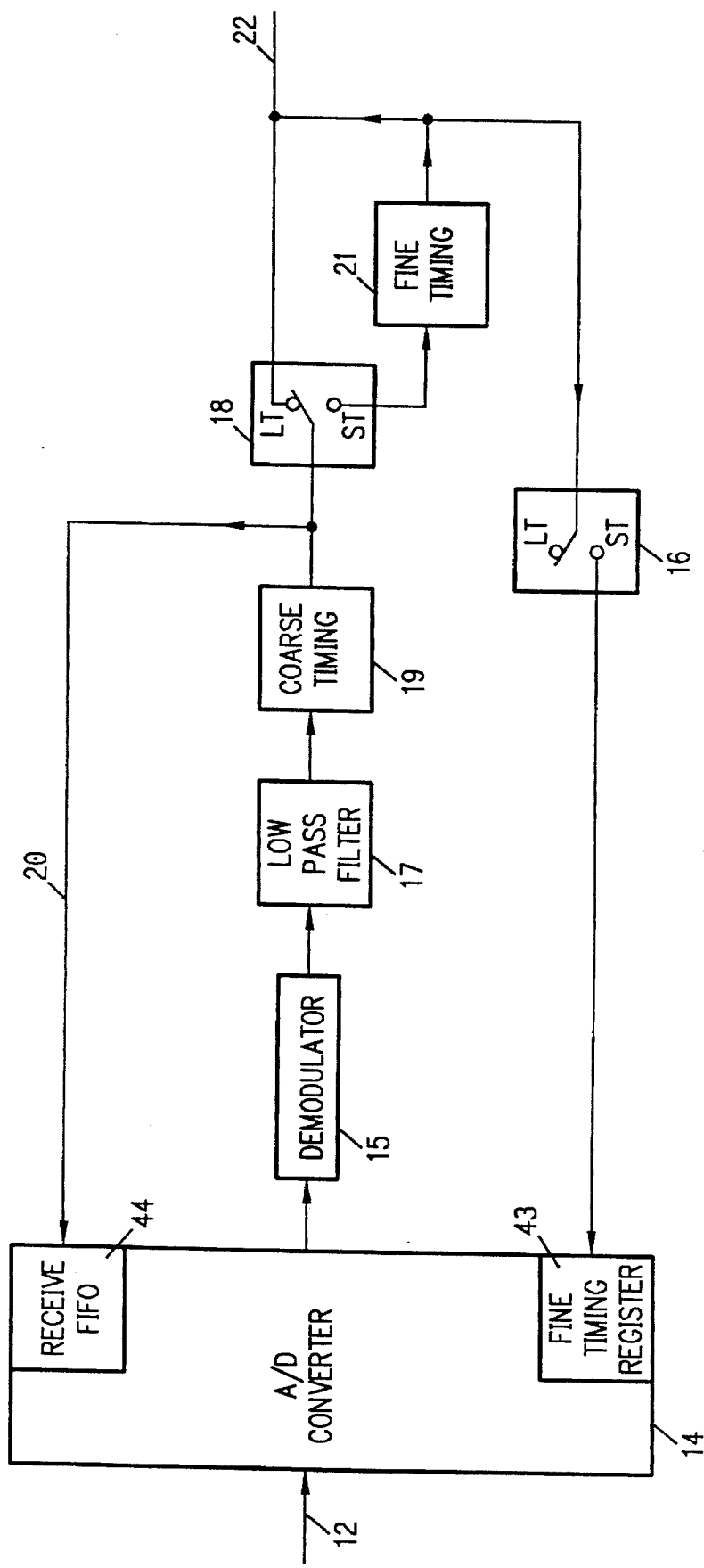
FIG. 2 is a block diagram of circuitry arranged in accordance with the present invention.

The modem circuitry used to implement the present invention is shown in FIG. 2. Although FIG. 2 is described solely in terms of hardware, i.e. circuit blocks, the described function of one or more of the circuit blocks can also be performed with software by suitably programming a digital computer in a well known way.

Briefly, the analog signal received on transmission line 12 is digitized by A/D converter 14 and demodulated by demodulator 15. Low pass filter ("LPF") 17 provides a signal from which high frequencies, such as are caused by the demodulation are removed. For the long training sequence, switches 16 and 18 are set to the LT position. In this state fine timing circuit 21 is rendered effectively inactive because its input and output are connected to terminals that are not connected in circuit with anything. The output of coarse timing circuit 19 is coupled via contact terminal LT of switch 18 to output line 22 which leads to other parts of the modem where further signal processing takes place. The output of circuit 19 is also fed back to receive FIFO (first in first out) register 44 in A/D converter 14 to identify the symbol boundary.

For the short training sequence, switches 16 and 18 are placed in the ST setting so that the fine timing circuit 21 receives the output of circuit 19. The output of circuit 21 is provided to line 22 and, in addition, via switch 16 to fine timing register 43 of A/D converter 14 which adjusts the sampling instance.

The arrangement of FIG. 2 will now be described in greater detail.

The receiver modem receives an analog signal from the transmission line 12 on which data is being transferred. For signal transmissions by modem, it is conventional to select a carrier signal having a frequency of 1700 Hz in V.29 and 1800 Hz in V.27. The selection of these frequencies ensures that the signal spectrum is centered with respect to the bandwidth of the telephone network, for example, which is typically 300 Hz to 3,300 Hz. The carrier is modulated, in accordance with the V.29 standard, for example, by 16, 8 or 4 symbols, depending on whether the transmission speed is 9600, 7200, 4800 or 2400 bps, respectively. The amplitude and phase of these symbols are specified by the standard in accordance with "signal space coding", as graphically shown on what is commonly known as a constellation diagram.

As explained above, the leading portion of the received signal is used for the training procedure to condition the receiver modem. When a connection is initiated, the receiver modem starts sampling asynchronously from the transmitter because the receiver modem is not at all synchronized on symbol boundary. Establishment of synchronization on a symbol boundary is the purpose of the coarse timing algorithm. The fine timing algorithm has as its task to improve upon the symbol boundary synchronization achieved by the coarse timing algorithm in order to set an accurate sampling instance occurring at the peak power of the symbol.

The training procedure used for the V.27ter and V.29 modems generates a signal, specified by the standards, which is transmitted to assist, inter alia, with timing acquisition. During segment 3 (mentioned above) of the training sequences, the standard requires modulation of the carrier by a baseband signal which is specified to be a series of symbols that are alternations between two points on the constellation diagram. These two points are specified by the standard which refers to them as element (A) and element (B). Since the points graphed on a constellation diagram correspond to symbols, the two elements are actually symbols. However, the alternations transmitted during the training procedure will be referred to below as elements (A) and (B).

At the receiver modem, elements (A) and (B) are inputted to A/D converter 14 from line 12, as shown in FIG. 2. A/D converter 14 is implemented as a Sigma-Delta codec (i.e. a COder DECoder which is another name for an A/D D/A device). Details of a sigma-delta ("S-D") codec are well known, as described, for example in the book "Oversampling Delta-Sigma Data Converters, Theory, Design and Simulation" by Candy and Temes, IEEE 1992. In accordance with the preferred embodiment, the codec is such as one designed into system controller NS32FX100, as well as other chips, available from National Semiconductor Corporation, Santa Clara, Calif.

Demodulator 15 receives the output of codec 14 and processes it to remove the carrier and restore the baseband signal which is centered around the frequency zero rather than the carrier. More specifically, the samples from codec 14 are multiplied by the complex carrier $\exp(-j \cdot 2 \cdot pi \cdot f)$, where f is the carrier frequency. This is the inverse of the modulation carried out by the transmitter modem which multiplies the baseband signal by the carrier $\exp(j \cdot 2 \cdot pi \cdot f)$. This modulation and demodulation is conventional and well known, so that details thereof are not deemed necessary.

Since the demodulation operation generates high frequencies, LPF is required to remove them. Consequently, the output of demodulator 15 is provided as an input to LPF 17. The LPF is implemented as a finite impulse response (FIR) filter. Details of FIR filters are well known to those with ordinary skill in the art and, therefore, details thereof are not deemed necessary. Suffice it to say that the output from demodulator 15 is a complex baseband signal, and the output of LPF 17 is a complex baseband signal with high order frequencies removed. Four samples of each of elements (A) and (B) are generated at the output of LPF 17, and these eight samples are shown graphically on FIG. 4 which is a graph in the complex plane. Samples 1, 2, 3 and 4 belong to element (A), and samples 5, 6, 7 and 8 belong to element (B).

Figure 4:
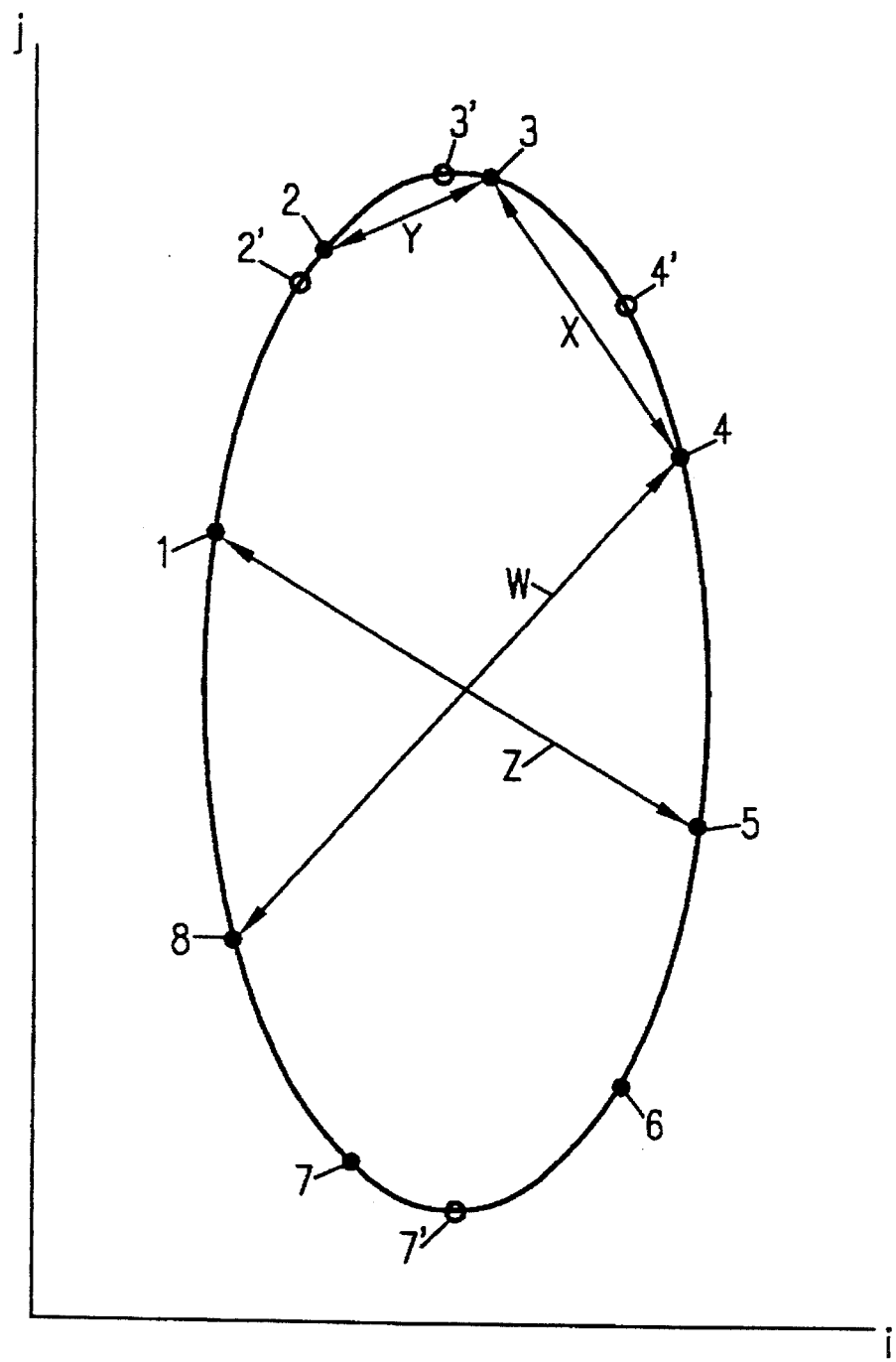
FIG. 4 is a graph in the complex plane depicting a constellation of points having characteristics used for the present invention.

For the long training sequence, a coarse timing algorithm is performed with circuit 19 by utilizing the graphed output of LPF 17 depicted in FIG. 4. The coarse timing algorithm includes the following steps.

Using the V.29 standard as an example, four samples per element (9600 sample/sec which are divided by the 2400 symbol/sec that are transmitted with V.29) are provided. The output for each sample is obtained from LPF 17 as a complex signal. Assuming that element (A) is the current element and element (B) is the previous one, the Euclidean distance between corresponding samples thereof, as shown in FIG. 4, is calculated. It is apparent that the distance between one of the four pairs of samples will be the shortest. In the case of FIG. 4, the distance between samples 1 and 5 is the shortest. Sample 1 of element (A) is, therefore, regarded as being the "zero crossing" point, i.e. it represents the boundary between the two alternating elements. Likewise, samples 3 and 7 are the pair which have the longest distance between them and, as such, represent the peak power position of element (A) which is at its center. Rather than relying on only one set of distances obtained from two elements, it is preferable to determine such set as the average distances obtained from a number of elements, such as eight.

Since sample 1 was identified as the zero-crossing point, no corrective action is necessary because this sample already represents the symbol boundary. However, if sample 2 had been found to be the zero-crossing point, for example, then sample 1 of the next element would be discarded, and the next sample, i.e. sample 2, would be regarded as sample 1 from which to begin the sampling "window" which represents the boundaries of an element.

Ganged single pole, double throw switches 16 and 18 are used to alter operation of the circuitry depending on whether a long or short training sequence is being performed. This is because in the long training sequence, only a coarse timing determination is made, whereas in the short training sequence, both coarse and fine timing determinations are made. More specifically, while the training procedure is in the long training sequence, the pole of switch 16 is ganged with that of switch 18 so that both engage their respective LT contact terminal. Likewise, during the short training sequence, both poles engage their respective ST contact terminal. Thus, for a long training sequence, the output of the coarse timing circuit 19 is passed by switch 18 to line 22 which feeds it to other circuits in the modem for further processing of the received information data. Such further processing is well known and forms no part of the invention. If, however, a short training sequence is being conducted, then the pole of switch 18 will engage contact terminal ST to provide its signal to the fine timing circuit 21. In such a case, line 22 will receive a signal from fine timing circuit 21, and no signal from switch 18. At the same time, switch 16 will pass the signal from circuit 21 to fine timing register 43 of A/D converter 14.

The output of coarse timing circuit block 19 is provided as timing control signal 20 to receive FIFO register 44 in A/D converter 14 Register 44 shifts the sampling "window", as explained above. For example, it can be register SDRX in the above-mentioned system controller from National Semiconductor Corporation.

A more detailed explanation of FIG. 4 and what it represents will now be provided so that the short training sequence and, in particular, the fine timing performed in accordance with the invention can be understood and appreciated. As stated above, samples 1–4 belong to element (A) and samples 5–8 belong to element (B). Because they are produced by alternating elements, one pair of corresponding samples from the two elements represents the maximum amplitude difference therebetween. All the other pairs of corresponding samples represent lesser amplitude differentials, with one such pair providing the minimum which was used above to produce the zero crossing point. Let us identify the maximum amplitude as being between samples 3 and 7. A chord X is defined as being between sample 3 and adjacent succeeding sample point 4, while chord Y is defined as being between sample 3 and its immediately preceding sample point 2.

Ideally, the mapping of all of these samples 1–8 would produce a straight line with samples 3 and 7 being at its ends, and the other samples would be represented by points on that line. However, due to line distortion, i.e. phase delay, the samples fall on the ellipse drawn in FIG. 4. The diagram is that of a complex plane, with the abscissa being the real axis and the ordinate being the imaginary axis. The ellipse can lie anywhere on the plane and it can be rotated at any angle relative to the axes at this stage of the processing, depending on the phase distortion. The length of the ellipse is a function of the signal gain and is of little consequence for our purposes. The orientation of the ellipse is also irrelevant for the purposes of the present invention. However, the width is indicative of the telephone line transfer function. The larger the line distortion, the bigger is the width.

When the synchronization is perfect, samples 3 and 7 will lie at the vertices of the ellipse between which the maximum distance exists, as shown by phantom points 3' and 7'. Since samples 2 and 4 occur at identical sampling intervals from sample 3, the length of chords X and Y would be equal due to the symmetry of the ellipse, as shown by phantom points 2', 3' and 4'. Thus, when 3 is rotated clockwise of 3', i.e. when X>Y, the position of the sampling window must be shifted counterclockwise. Likewise, when 3 is rotated counterclockwise, i.e. when X<Y, the position of the sampling window must be shifted clockwise. Before it begins, a control signal from the main control unit (not shown) of the modem actuates notches 16 and 18 to the ST position.

Figure 3:
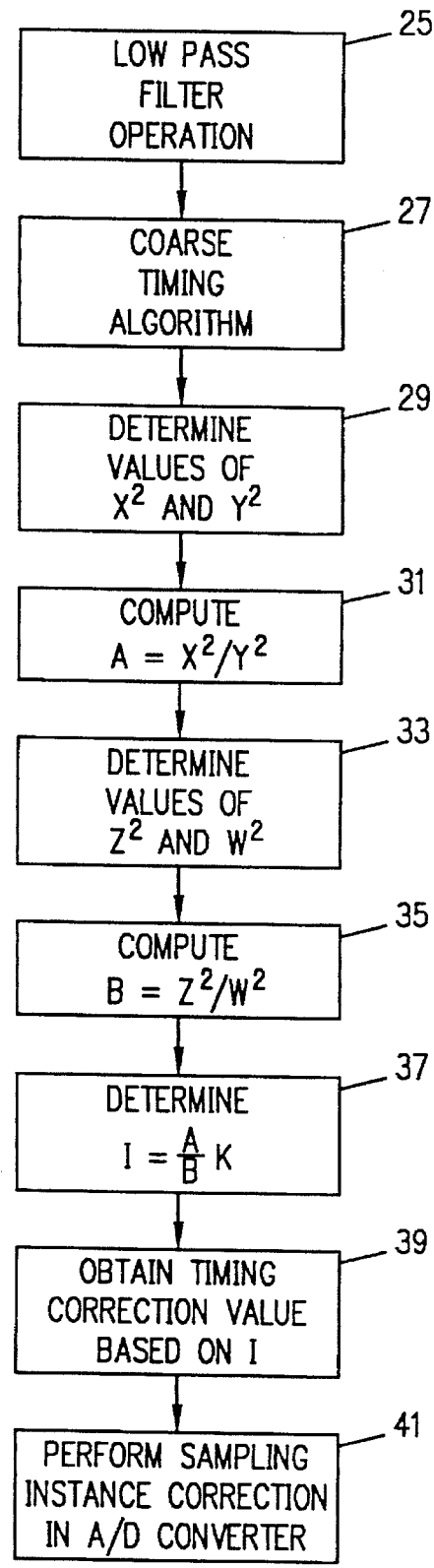
FIG. 3 is a flowchart of steps performed in accordance with the present invention during segment 3 of a short training sequence.

The short training sequence will now be described in detail. As explained above, the short training sequence includes a coarse timing algorithm and a fine timing algorithm. The coarse timing algorithm used for the short training sequence is the same one described above for the long training sequence. At the conclusion of the coarse timing algorithm, circuit 21 of FIG. 2 then performs the fine timing algorithm in accordance with principles of the present invention, the details of which will be made clear below in connection with the description of FIG. 3. The output of circuit 21 provides the synchronization timing output signal 22 used by the receiver modem. This output is also fed back to codec 14 to adjust the sampling instant, as explained below.

The symbol zero crossing point is found in step 27 by the above-described coarse timing algorithm. This serves to identify the samples shown in FIG. 4 which have the longest distance therebetween, i.e. samples 3 and 7 in our example. The values $X^2$ and $Y^2$ are calculated in step 29. Although the values of interest are X and Y, the squared values are easier to work with because the length of the chords is obtained as a Euclidean distance with the squared values. Calculating the square root requires added processing and would serve no useful purpose.

Symbol timing is perfect if $X^2=Y^2$, as explained above. If $X^2>Y^2$, a timing advance is required so that the sampling window is shifted counterclockwise, as shown in FIG. 4. If $X^2<Y^2$, a timing delay operation is required.

Ratio $A = X^2/Y^2$ is computed by step 31. The ratio of $X^2/Y^2$ varies not only based on timing deviation, but also based on the shape of the ellipse. Since the modem has to operate on a variety of line conditions, this shape-related variation has to be normalized. Values $Z^2$ and $W^2$ are derived in step 33, and ratio $B=Z^2/W^2$ is then computed by step 35 as a normalization factor proportional to the ellipse width.

Index value I is determined in step 37 by $$I=(A/B)*K$$

where K is an empirical constant.

Each value of I corresponds to a number of steps by which the timing of the sampling instance is shifted. The following table is an empirically determined example of timing correction steps corresponding to values of I.

TABLE 2

| I | Steps |
|---|---|
| 0 | 0 |
| 1 | 6 |
| 2 | 16 |
| 3 | 24 |
| 4 | 30 |
| 5 | 35 |
| 6 | 38 |
| 7 | 42 |
| 8 | 44 |
| 9 | 47 |
| 10 | 49 |
| 11 | 50 |
| 12 | 54 |
| 13 | 56 |

TABLE 2-continued

| I | Steps |
|---|---|
| 14 | 60 |
| 15 | 64 |

This table was determined for V.29 and V.27ter modems. The timing correction value is obtained in step 39 from Table 2, and it is applied to the S-D codec 14.

In accordance with the present invention, the S-D codec 14 in the above-mentioned system controller from National Semiconductor Corporation has a four bit fine timing register 43 with four bits being dedicated to timing acquisition. With three of these bits, register 43 is capable of being set to any value between 0 and 7. Each such value corresponds to a shift of the sampling point in codec 14 by units of $1/128$ of the sample. The fourth bit is a control bit which controls whether the number of units set in the other three bits produces a delay or an advance, depending on the value of the control bit.

The number of timing correction units derived by step 39 are applied per step 41 to acquire timing by taking into account the rate the S-D codec 14 can perform those changes. More specifically, as explained above, S-D codec 14 can operate by shifting up to a limit of seven units per command. If, for example, a shift of 50 units is necessary, at least eight timing change commands are spread over several symbols to effect such shift. In the preferred embodiment, a shift of no more than two units is carried out per symbol and, therefore, 25 symbols would be needed to effect a shift of 50 units.

Although details of a preferred embodiment have been described above, various modifications thereto will be readily apparent to one with ordinary skill in the art. For example, the invention is applicable to standards other than the two discussed herein. Also, a modulation other than QAM can be used. It is likewise possible to apply the present invention to simplex and/or full-duplex communication. For example, some applications which require a full-duplex modem actually transfer data only from one side to the other most of the time. Rather than using a relatively expensive full-duplex modem, a half-duplex modem is used which, in accordance with the present invention, can emulate a full-duplex modem by virtue of a fast direction reversal made possible by using a short training sequence. In addition, the present invention can also be applicable to a fine timing determination made for a long training sequence. Furthermore, an A/D converter other than an S-D codec can be used which provides control of the sampling instance. Likewise, a low pass filter other than FIR is usable. Although switches 16 and 18 are depicted as having a mechanical structure, these can be implemented electronically or otherwise, in any well known way, to implement the functions disclosed above. In addition, the same coarse algorithm has been disclosed for both the short and long sequence, but different ones can be used as well. These and all other such changes are intended to fall within the scope of the present invention as defined by the following claims.

We claim:

1. Apparatus for synchronizing modems located at opposite ends of a transmission line with each other as one modem receives an analog signal while a connection is established with another modem over the transmission line, comprising:

an analog to digital (A/D) converter coupled to the transmission line for receiving at its input the analog signal to provide a digitized output signal by sampling the analog signal at a sampling instance;

means for deriving a plurality of samples for each of two alternating elements received as part of the analog signal by said A/D converter;

means for identifying one of said plurality of samples for one of said two alternating elements at which a designated amplitude difference exists between said two alternating elements;

means for comparing, for said one of said two alternating elements, a relationship of said one of said plurality of samples to its preceding one and a relationship of said one of said plurality of samples to its succeeding one to provide a timing control signal; and wherein said A/D converter includes means for shifting said sampling instance in response to said timing control signal.

2. The apparatus of claim 1, wherein said shifting means of the A/D converter shifts said sampling instance to occur at a peak of said alternating elements.

3. The apparatus of claim 2, wherein said identifying means provides data representative of a plurality of points plotted on a graph respectively corresponding to said plurality of samples of said two alternating elements, and determines a value representative of a distance between pairs of said points, with said pair being from different ones of said two alternating elements.

4. The apparatus of claim 3, wherein said comparing means compares values representative of a first distance on said graph between points corresponding to the identified sample and its succeeding one, and a second distance between points corresponding to the identified sample and its preceding one.

5. The apparatus of claim 4, wherein said graph is in the complex plane.

6. The apparatus of claim 5, wherein said comparing means normalizes said relationship for characteristics of the transmission line.

7. The apparatus of claim 6, wherein said designated amplitude difference is a maximum.

8. The apparatus of claim 4, wherein said comparison between the first and second distances is a ratio.

9. The apparatus of claim 5, wherein said comparing means derives index value $I=(A/B)*K$, where K is an empirically derived coefficient, $A=X^2/Y^2$, $B=Z^2/W^2$, X is said first distance, Y is said second distance, and Z and W reflect the width of an ellipse defined by said plurality of points.

10. The apparatus of claim 9, wherein said comparing means includes conversion means for providing units of shift as said timing control signal based on the value of I.

11. The apparatus of claim 1, wherein said A/D converter is of an oversampling type.

12. The apparatus of claim 1, wherein said designated amplitude difference is a maximum.

13. The apparatus of claim 1, wherein said comparing means normalizes said relationship for characteristics of the transmission line.

14. The apparatus of claim 1, wherein said modem is a half-duplex modem.

15. The apparatus of claim 1, wherein said two alternating elements are set by a transmission standard in accordance with which the modem operates.

16. The apparatus of claim 1, wherein said identifying means provides data representative of a plurality of points plotted on a graph respectively corresponding to said plurality of samples of said two alternating elements, said points defining an ellipse, and wherein the relationship compared in said comparing means is related to displacement of a point from among said plurality of points which corresponds to the identified sample from a vertex of said ellipse.

17. A modem for receiving information data as symbols in the form of an analog signal from another modem over a transmission line during each of a plurality of communication sessions ocurring while a connection is established therebetween, said analog signal including a training sequence to synchronize said modems with each other during a training procedure performed at the initiation of a communication session so that the information data is received accurately, comprising:

an analog to digital (A/D) converter coupled to the transmission line for receiving at its input the analog signal to provide a digitized output signal by sampling the analog signal at a sampling instance;

means for deriving a plurality of samples for each of two alternating elements received as part of the analog signal by said A/D converter;

coarse timing circuitry coupled to said deriving means to locate the symbol boundary;

fine timing circuitry coupled to said coarse timing circuitry for synchronizing the modem with said other modem, including:
        (a) means for identifying one of said plurality of samples for one of said two alternating elements at which a designated amplitude difference exists between said two alternating elements, and
        (b) means for comparing, for said one of said two alternating elements, a relationship of said one of said plurality of samples to its preceding one and a relationship of said one of said plurality of samples to its succeeding one to provide a timing control signal;

wherein said A/D converter includes means for shifting said sampling instance in response to said timing control signal; and means for reconstituting said symbols in accordance with said timing control signal.

18. The modem of claim 17, wherein said shifting means of the A/D converter shifts said sampling instance to occur at a peak of said alternating elements.

19. The modem of claim 18, wherein said identifying means provides data representative of a plurality of points plotted on a graph respectively corresponding to said plurality of samples of said two alternating elements, and determines a value representative of a distance between pairs of said points, with said pair being from different ones of said two alternating elements.

20. The modem of claim 19, wherein said comparing means compares values representative of a first distance on said graph between points corresponding to the identified sample and its succeeding one, and a second distance between points corresponding to the identified sample and its preceding one.

21. The modem of claim 20, wherein said graph is in the complex plane.

22. The modem of claim 21, wherein said comparing means normalizes said relationship for characteristics of the transmission line.

23. The modem of claim 22, wherein said designated amplitude difference is a maximum.

24. The modem of claim 20, wherein said comparison between the first and second distances is a ratio.

25. The modem of claim 21, wherein said comparing means derives index value $I=(A/B)*K$, where K is an empirically derived coefficient, $A=X^2/Y^2$, $B=Z^2/W^2$, X is said first distance, Y is said second distance, and Z and W reflect the width of an ellipse defined by said plurality of points.

26. The modem of claim 25, wherein said comparing means includes conversion means for providing units of shift as said timing control signal based on the value of I.

27. The modem of claim 17, wherein said A/D converter is of an oversampling type.

28. The modem of claim 17, wherein said designated amplitude difference is a maximum.

29. The modem of claim 17, wherein said comparing means normalizes said relationship for characteristics of the transmission line.

30. The modem of claim 17, wherein said modem is a half-duplex modem.

31. The modem of claim 17, wherein said two alternating elements are set by a transmission standard in accordance with which the modem operates.

32. The modem of claim 17, further comprising a demodulator between said A/D converter and said coarse timing circuitry.

33. The modem of claim 32, further comprising a low pass filter between said demodulator and said coarse timing algorithm.

34. The modem of claim 33, wherein said training procedure includes a long training sequence and a short training sequence, said long training sequence being used for the first communication session of a connection, and said short training session being used for all ensuing communication sessions of such connection, further comprising means for coupling said coarse timing circuitry to the reconstituting means while uncoupling the fine timing circuitry from the modem during said long training session and, during the short training session, coupling the output of the coarse timing circuitry to the input of said fine timing circuitry so that the output thereof is coupled to the symbol reconstituting means.

35. The modem of claim 17, wherein said training procedure includes a long training sequence and a short training sequence, said long training sequence being used for the first communication session of a connection, and said short training session being used for all ensuing communication sessions of such connection, further comprising means for coupling said coarse timing circuitry to the reconstituting means while uncoupling the fine timing circuitry from the modem during said long training session and, during the short training session, coupling the output of the coarse timing circuitry to the input of said fine timing circuitry so that the output thereof is coupled to the symbol reconstituting means.

36. The modem of claim 17, wherein said identifying means provides data representative of a plurality of points plotted on a graph respectively corresponding to said plurality of samples of said two alternating elements, said points defining an ellipse, and wherein the relationship compared in said comparing means is related to displacement of a point from among said plurality of points which corresponds to the identified sample from a vertex of said ellipse.

37. A method for synchronizing modems located at opposite ends of a transmission line with each other as one modem receives an analog signal while a connection is established with another modem over the transmission line, comprising the steps of:

an analog to digital (A/D) conversion made by receiving the analog signal and providing a digitized signal by sampling the analog signal at a sampling instance;

deriving a plurality of samples for each of two alternating elements that form part of the analog signal;

identifying one of said plurality of samples from one of said two alternating elements at which a designated amplitude difference exists between said two alternating elements;

comparing, for said one of said two alternating elements, a relationship of said one of said plurality of samples to its preceding one and a relationship of said one of said plurality of samples to its succeeding one to provide a timing control signal; and shifting said sampling instance in response to said timing control signal.

38. The method of claim 37, wherein said shifting step shifts said sampling instance to occur at a peak of said alternating elements.

39. The method of claim 37, wherein said identifying step provides data representative of a plurality of points plotted on a graph respectively corresponding to said plurality of samples of said two alternating elements, and determines a value representative of a distance between pairs of said points, with said pair being from different ones of said two alternating elements.

40. The method of claim 39, wherein said comparing step compares values representative of a first distance on said graph between points corresponding to the identified sample and its succeeding one, and a second distance between points corresponding to the identified sample and its preceding one.

41. The method of claim 37, wherein said designated amplitude difference is a maximum.

42. The method of claim 37, wherein said comparing step normalizes said relationship for characteristics of the transmission line.

43. The method of claim 37, wherein said two alternating elements are set by a transmission standard in accordance with which the modem operates.

44. A method for receiving information data as symbols in the form of an analog signal from another modem over a transmission line during each of a plurality of communication sessions ocurring while a connection is established therebetween, said analog signal including a training sequence to synchronize said modems with each other during a training procedure performed at the initiation of a communication session so that the information data is received accurately, comprising the steps of:

analog to digital (A/D) conversion receiving the analog signal and providing a digitized output signal by sampling the analog signal at a sampling instance;

deriving a plurality of samples for each of two alternating elements that form part of the analog signal;

locating the symbol boundary from said plurality of samples with a coarse timing algorithm;

synchronizing the modem to said other modem with a fine timing algorithm based on the coarse timing algorithm, including:

(a) identifying one of said plurality of samples for one of said two alternating elements at which a designated amplitude difference exists between said two alternating elements, and (b) comparing, for said one of said two alternating elements, a relationship of said one of said plurality of samples to its preceding one and a relationship of said one of said plurality of samples to its succeeding one to provide a timing control signal;

wherein said sampling instance is shifted in response to said timing control signal; and reconstituting said symbols in accordance with said timing control signal.

45. The method of claim 44, wherein said shifting step shifts said sampling instance to occur at a peak of said alternating elements.

46. The method of claim 44, wherein said identifying step provides data representative of a plurality of points plotted on a graph respectively corresponding to said plurality of samples of said two alternating elements, and determines a value representative of a distance between pairs of said points, with said pair being from different ones of said two alternating elements.

47. The method of claim 44, wherein said comparing step compares values representative of a first distance on said graph between points corresponding to the identified sample and its succeeding one, and a second distance between points corresponding to the identified sample and its preceding one.

48. The method of claim 44, wherein said designated amplitude difference is a maximum.

49. The method of claim 44, wherein said comparing step normalizes said relationship for characteristics of the transmission line.

50. The method of claim 44, wherein said two alternating elements are set by a transmission standard in accordance with which the modem operates.

51. An apparatus for synchronizing modems located at opposite ends of a transmission line with each other as one modem receives an analog signal while a connection is established with another modem over the transmission line, comprising:

an oversampling analog to digital (A/D) converter coupled to the transmission line;

means coupled to an output of said A/D converter for deriving data points from samples taken from two elements in the analog signal transmitted by the other modem in accordance with a training procedure set by a modem transmission standard, such data points defining an ellipse when plotted on a graph;

means for identifying one of said data points which, for a given one of the two elements, is closest to a vertex of said ellipse;

means for determining displacement of the one data point from the vertex to produce a timing control signal related thereto; and means for controlling sampling by said A/D converter in accordance with said timing control signal.

52. The apparatus of claim 51, wherein said controlling means shifts a sampling instance by said A/D converter to occur at a peak of said alternating elements.

53. The apparatus of claim 51, wherein said graph is in the complex plane.

54. The apparatus of claim 51, wherein said determining means determines the amount and direction of said displacement.

55. A modem for receiving information data as symbols in the form of an analog signal from another modem over a transmission line during each of a plurality of communication sessions ocurring while a connection is established therebetween, said analog signal including a training sequence to synchronize said modems with each other during a training procedure performed at the initiation of a communication session so that the information data is received accurately, comprising:

an oversampling analog to digital (A/D) converter coupled to the transmission line;

means coupled to an output of said A/D converter for deriving data points from samples taken from two elements in the analog signal transmitted by the other modem in accordance with a training procedure set by a modem transmission standard, such data points defining an ellipse when plotted on a graph;

coarse timing circuitry coupled to said deriving means to locate the symbol boundary;

fine timing circuitry coupled to said coarse timing circuitry for synchronizing the modem with said other modem, including:
  (a) means for identifying one of said data points which, for a given one of the two elements, is closest to a vertex of said ellipse, and
  (b) means for determining displacement of the one data point from the vertex to produce a timing control signal related thereto;

means for controlling sampling by said A/D converter in accordance with said timing control signal; and means for reconstituting said symbols in accordance with said timing control signal.

56. The modem of claim 55, wherein said controlling means shifts a sampling instance by said A/D converter to occur at a peak of said elements.

57. The modem of claim 55, wherein said graph is in the complex plane.

58. The modem of claim 55, wherein said determining means determines the amount and direction of said displacement.

59. A method for synchronizing modems located at opposite ends of a transmission line with each other as one modem receives an analog signal while a connection is established with another modem over the transmission line, comprising:

oversampling an analog to digital (A/D) conversion to digitize signals received from the transmission line;

deriving from the digitized signals data points obtained with samples taken from two elements in the analog signal transmitted by the other modem in accordance with a training procedure set by a modem transmission standard, such data points defining an ellipse when plotted on a graph;

identifying one of said data points which, for a given one of the two elements, is closest to a vertex of said ellipse;

determining displacement of the one data point from the vertex to produce a timing control signal related thereto; and controlling sampling by said A/D converter in accordance with said timing control signal.

60. The method of claim 59, wherein said controlling step shifts a sampling instance by said A/D conversion to occur at a peak of said elements.

61. The method of claim 59, wherein said graph is in the complex plane.

62. The method of claim 59, wherein said determining step determines the amount and direction of said displacement.

63. A method for receiving information data as symbols in the form of an analog signal from another modem over a transmission line during each of a plurality of communication sessions ocurring while a connection is established therebetween, said analog signal including a training sequence to synchronize said modems with each other during a training procedure performed at the initiation of a communication session so that the information data is received accurately, comprising the steps of:

oversampling an analog to digital (A/D) conversion to digitize signals received from the transmission line;

deriving from the digitized signals data points obtained with samples taken from two elements in the analog signal transmitted by the other modem in accordance with a training procedure set by a modem transmission standard, such data points defining an ellipse when plotted on a graph;

locating the symbol boundary from said data points with a coarse timing algorithm;

synchronizing the modem with said other modem with a fine timing algorithm based on the result of said coarse timing algorithm, including:
  (a) identifying one of said data points which, for a given one of the two elements, is closest to a vertex of said ellipse, and
  (b) determining displacement of the one data point from the vertex to produce a timing control signal related thereto;

controlling sampling by said A/D conversion in accordance with said timing control signal; and reconstituting said symbols in accordance with said timing control signal.

64. The method of claim 63, wherein said controlling step shifts a sampling instance by said A/D conversion to occur at a peak of said elements.

65. The method of claim 63, wherein said graph is in the complex plane.

66. The method of claim 59, wherein said determining step determines the amount and direction of said displacement.

* * * * *